United States Patent
Mercier et al.

(10) Patent No.: US 12,359,614 B2
(45) Date of Patent: Jul. 15, 2025

(54) DEVICE FOR DE-ICING A TURBOMACHINE NOZZLE

(71) Applicant: SAFRAN AIRCRAFT ENGINES, Paris (FR)

(72) Inventors: Rémi Roland Robert Mercier, Moissy-Cramayel (FR); Fabrice Michel François René Aubert, Moissy-Cramayel (FR); Arnaud Langlois, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/287,457

(22) PCT Filed: Oct. 22, 2019

(86) PCT No.: PCT/FR2019/052511
§ 371 (c)(1),
(2) Date: Apr. 21, 2021

(87) PCT Pub. No.: WO2020/084248
PCT Pub. Date: Apr. 30, 2020

(65) Prior Publication Data
US 2021/0388762 A1 Dec. 16, 2021

(30) Foreign Application Priority Data

Oct. 22, 2018 (FR) ...................................... 1859742

(51) Int. Cl.
*F02C 7/047* (2006.01)
*F01D 9/04* (2006.01)
(Continued)

(52) U.S. Cl.
CPC .............. *F02C 7/047* (2013.01); *F01D 9/044* (2013.01); *F01D 25/02* (2013.01); *F01D 25/246* (2013.01)

(58) Field of Classification Search
CPC .... F02C 7/047; F01D 25/02; F01D 9/04-042; F01D 25/246;
(Continued)

(56) References Cited

U.S. PATENT DOCUMENTS 10,060,351 B2 * 8/2018 Oggero ................... F02C 7/047
10,392,965 B2 * 8/2019 Cortequisse ............ F02C 7/047
(Continued)

FOREIGN PATENT DOCUMENTS

| CN | 107044447 A | 8/2017 | |
| EP | 2607655 A2 * | 6/2013 | ............... F02C 3/32 |
| EP | 3156615 A1 | 4/2017 | |

OTHER PUBLICATIONS

French Search Report for French Application No. 1859742, dated Jun. 26, 2019.
(Continued)

*Primary Examiner* — Kristina N Junge
*Assistant Examiner* — Jingchen Liu
(74) *Attorney, Agent, or Firm* — Birch, Stewart, Kolasch & Birch, LLP

(57) ABSTRACT

A de-icing device to supply de-icing air to a turbomachine separation nozzle extending along a longitudinal axis, the turbomachine comprising: a separation nozzle positioned downstream from a turbomachine fan and comprises an internal casing and an external casing which form a separation between a primary flow vein for a primary stream and a secondary flow vein for a secondary stream, the internal casing and the external casing defining an inter-vein space; turbomachine guide vanes secured by screws to the internal (Continued)

casing, the screws extend into the inter-vein space, the de-icing device positioned in the inter-vein space and comprising an air inlet; an air outlet; a plurality of channels extending from the air inlet toward the air outlet; the channels arranged in relation to one another such that they extend from the air inlet toward the air outlets, passing between the screws for securing the guide vanes.

4 Claims, 3 Drawing Sheets

(51) Int. Cl.
*F01D 25/02* (2006.01)
*F01D 25/24* (2006.01)

(58) Field of Classification Search
CPC .... B64D 2013/0607; B64D 2013/0666; B64D 15/00–22; B64D 2033/0233; B64C 1/067; F05D 2240/80–91; F23R 2900/03343
See application file for complete search history.

(56) References Cited

U.S. PATENT DOCUMENTS

| | | |
|---|---|---|
| 2005/0050877 A1 | 3/2005 | Venkataramani et al. |
| 2010/0242428 A1* | 9/2010 | Vauchel .................. F02C 7/047 60/39.093 |
| 2016/0097323 A1* | 4/2016 | Prather .................. F01D 25/02 415/178 |
| 2017/0107906 A1 | 4/2017 | Oggero |
| 2017/0298760 A1* | 10/2017 | Vallino .................. F01D 25/10 |
| 2019/0078469 A1* | 3/2019 | Simonds .................. F02C 3/04 |
| 2019/0226402 A1* | 7/2019 | Kray ...................... B64D 33/02 |

OTHER PUBLICATIONS

International Search Report (Forms PCT/ISA/220 and PCT/ISA/210) for International Application No. PCT/FR2019/052511, dated Feb. 28, 2020.
Written Opinion of the International Searching Authority (Form PCT/ISA/237) for International Application No. PCT/FR2019/052511, dated Feb. 28, 2020.

* cited by examiner

DEVICE FOR DE-ICING A TURBOMACHINE NOZZLE

GENERAL TECHNICAL FIELD

The invention concerns the general field of turbomachines. The invention concerns more particularly a device for de-icing the front parts of a turbomachine, and more specifically a splitter nose of a turbomachine. The invention also concerns a de-icing nose provided with such a device, as well as a turbomachine including such a de-icing device.

STATE OF THE ART

In a twin-spool turbofan engine, the flow paths for the primary stream and the secondary stream are separated downstream of the fan by a splitter nose.

Such a splitter nose of a turbofan engine comprises an inner casing and an outer casing.

Within the primary flow path, at the inlet of the low-pressure compressor (also called booster), there is a set of stator and rotor blades for the progressive compression of the primary air stream.

In some flight and ground phases, icing atmospheric conditions may be encountered by the turbomachine, in particular when the ambient temperature is low and in the presence of high humidity. Under these conditions, ice may be formed on the splitter nose and the blades such as those of the first row of stator blades encountered by the primary air stream. When this phenomenon occurs, it can lead to the partial obstruction of the primary flow path, and to the ingestion of detached ice blocks in the primary flow path. An obstruction of the primary flow path causes undersupply of the combustion chamber which can then shut down or prevent the acceleration of the engine. In the case of detachment of ice blocks, these can damage the compressor located downstream and lead to the reduction of the service life of the blades, at the expense of the maintenance costs of the turbomachine.

To prevent the formation of ice on the splitter nose, techniques are known which consist in taking hot air from the primary flow path, by means of at least one de-icing tube, at the level of a compressor and in injecting it into an upstream end cavity inside the splitter nose. The hot air injected into the splitter nose can then travel through the nose up to bores or grooves configured to inject hot air into the primary flow path which can also de-ice the rotor and stator blades, particularly by spraying with hot air the first row of stator blades at the inlet of the primary flow path.

Such a solution is for example in document US 2003/0035719 A1, particularly considering FIG. 2 of this document.

One problem is that each stator blade can have a radial fastening system at the level of the inner casing which can be bulky when it is a fastening by screwing. Also, the inter-flow path space is constrained by the fastening system and by the space requirement of the splitter nose de-icing tubes. One constraint is to optimize the dimensioning and the geometry of the de-icing tube to allow an efficient supply of the cavity without the presence of the fastening system requiring to increase the volume of the nose so that the supply with de-icing air is efficient. Indeed, enough space must be provided to be able to place the de-icing tube.

However, the need for space in the inter-flow path space directly influences the shape of the aerodynamic flow paths of the primary stream and of the secondary stream with significant impacts on the performances and the mass, therefore the amount of fuel consumed by the engine.

PRESENTATION OF THE INVENTION

The invention proposes to overcome at least one of these drawbacks.

To this end, the invention proposes, according to a first aspect, a de-icing device intended to supply de-icing air for a turbomachine splitter nose extending along a longitudinal axis, said turbomachine comprising:
 the splitter nose which is intended to be positioned downstream of a fan of the turbomachine and comprising an inner casing and an outer casing to form a separation between a primary flow path for a primary stream and a secondary flow path for a secondary stream, said streams being derived from the fan, said inner casing and said outer casing defining an inter-flowpath space;
 guide blades of said turbomachine intended to be fixed by screws to the inner casing, so that said screws extend into the inter-flow path space,
 said de-icing device being intended to be positioned in the inter-flowpath space and comprises:
 an air inlet;
 an air outlet;
 a plurality of channels extending from the air inlet to the air outlet;
 the channels being arranged relative to each other so that they are intended to extend from the air inlet to the air outlets by passing between the screws for fixing the guide blades.

The invention is advantageously completed by the following characteristics, taken alone or in any one of their technically possible combination:
 the channels extending from the air inlet to the air outlet are cylindrical;
 the air inlet and/or the air outlet has/have a cylindrical section;
 one of the channels extends longitudinally between the air inlet and the air outlet.
 it comprises five channels.
 the device was obtained by additive manufacturing.

The invention proposes, according to a second aspect, a method for manufacturing a device for de-icing a turbomachine splitter nose according to the first aspect of the invention, in which said nose is obtained by means of additive manufacturing, preferably of the powder laser fusion type.

The invention proposes according to a third aspect a de-icing assembly comprising a plurality of de-icing devices according to the first aspect of the invention, the de-icing devices being intended to be disposed in the inter-flow path space around the inner casing, the air inlets of each of the de-icing devices being connected together by a hot air supply duct configured to bring hot air to each air inlet.

The invention proposes according to a fourth aspect a splitter nose of a turbomachine comprising an inner casing and an outer casing delimiting an inter-flow path space, said nose comprising a de-icing assembly according to the preceding claim, disposed in the inter-flow path space.

Thus, compared to the state of the art, the de-icing tube provided in the inter-flow path space is replaced by several pipes which pass between the fastening systems of the stator blades fixed to the inner casing.

Having a de-icing device which is integrated between the screws of the interflow path space of the splitter nose allows reducing the inter-flowpath space requirement.

In this way, the aerodynamic/engine performance compromise is greatly improved compared to the known solutions.

PRESENTATION OF THE FIGURES

Other characteristics, aims and advantages of the invention will emerge from the following description, which is purely illustrative and not limiting, and which should be read with reference to the appended drawings in which, in addition to the already discussed FIG. 1:

Figure 3A:
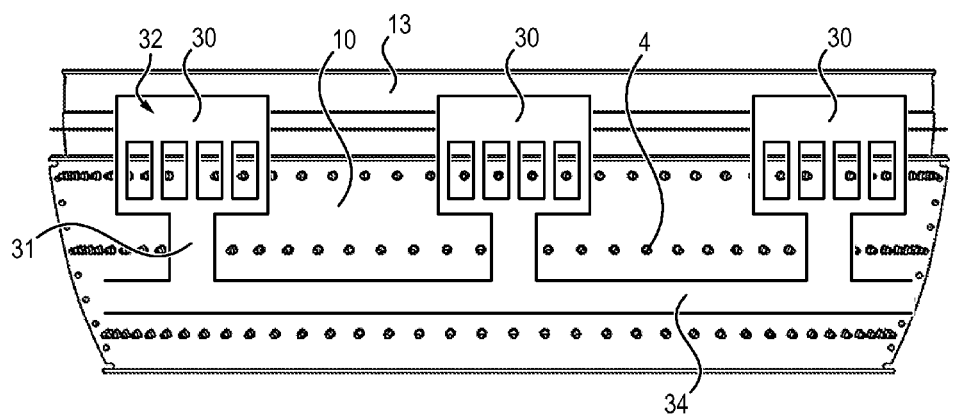
Figure 3B:
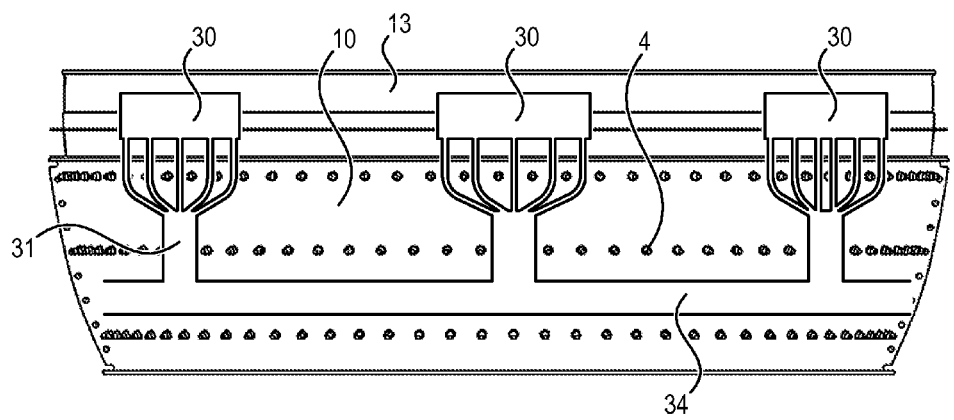

FIGS. 3a and 3b each illustrate a de-icing assembly according to two variants of the invention.

In all of the figures, similar elements bear identical references.

DETAILED DESCRIPTION OF THE INVENTION

Figure 1:
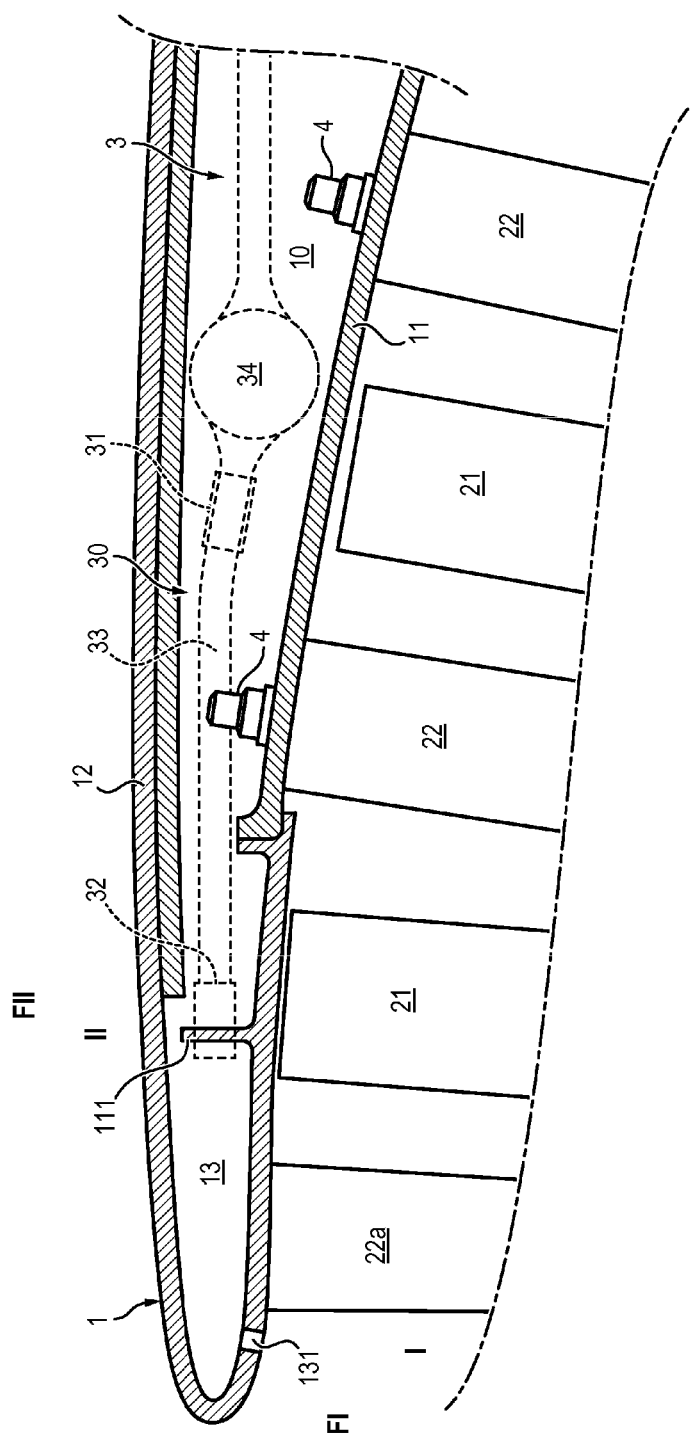
FIG. 1 illustrates a splitter nose of a turbofan engine comprising a de-icing device according to the invention.

FIG. 1 illustrates a splitter nose 1 of a turbofan engine comprising a de-icing device 30 according to the invention.

As already mentioned, the nose 1 comprises an inner casing 11 and an outer casing 12. In addition, within the primary flow path I, at the inlet of the low-pressure compressor 2 and then downstream, there are sets of stator 22, 22a then rotor 21 blades for the progressive compression of the primary air stream FI.

An upstream row of stator blades 22a comprises guide blades which are the first blades impacted by the primary stream FI at the primary flow path air inlet I.

To prevent the formation of ice on the splitter nose 1, a de-icing assembly allows supplying de-icing air initially taken at the level of the compressor via at least one tube 3 so that air can be injected into an upstream end cavity 13 inside the splitter nose 1. The hot air injected into the splitter nose 1 can then travel through this cavity of the nose 1 up to bores or grooves 131 allowing injecting the hot air into the primary flow path I so as to be able to de-ice the blades, particularly by spraying with hot air the first inlet guide row comprising stator blades 22a.

Each stator blade 22, 22a has a radial fastening system 4 at the level of the inner casing 11. In the represented embodiment, the first input guide row comprising stator blades 22a is for example mechanically welded to the casing 11. The other stator rows of guide blades 22 have a screwing-fastening system whose screws 4 are bulky. Also, the inter-flow path space 10 is constrained by the fastening system and by the space requirement of devices for de-icing 30 the splitter nose 1. As can be seen in FIG. 1, the fastening systems 4 require providing enough space to be able to place the de-icing devices 30 by hot air.

Figure 2:
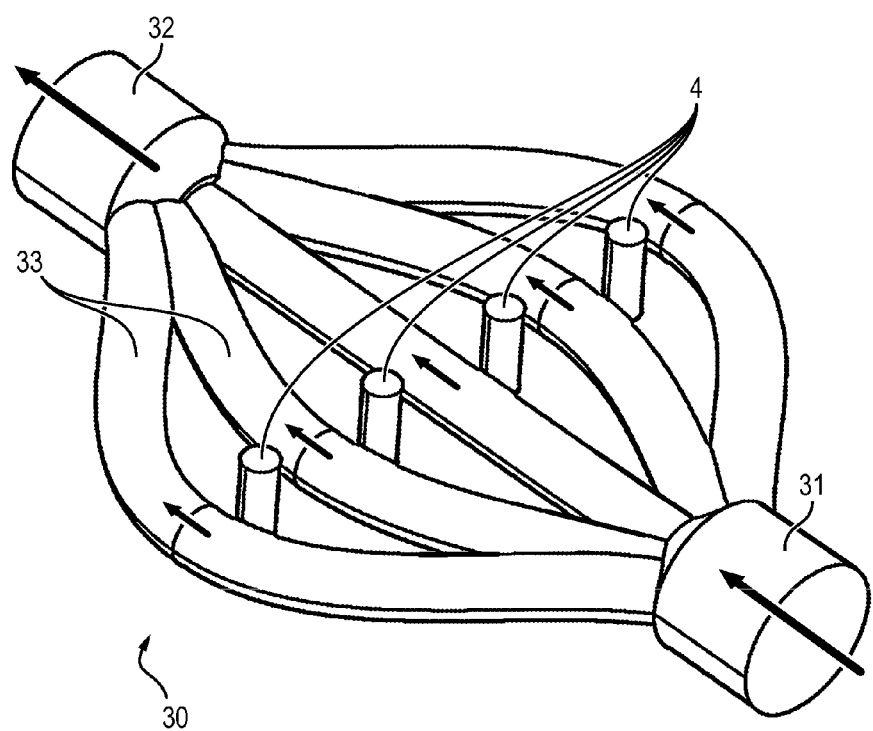
FIG. 2 illustrates a de-icing device according to the invention.

Referring to FIG. 1, the de-icing assembly comprising several de-icing devices 30 as illustrated on the one hand in FIG. 2 and on the other hand in FIGS. 3a and 3b. These devices are arranged in the inter-flow path space as illustrated in FIGS. 3a and 3b for example.

Each de-icing device 30 intended to be positioned in the inter-flow path space comprises an air inlet 31 and an air outlet 32. The air stream is represented by an arrow in FIG. 2. The air inlet 31 and the air outlet 32 are located facing each other and are preferably each constituted by a cylinder. Each de-icing device 30 is for example made of a material such as a nickel-based alloy such as inconel 625 or, where appropriate, such as steel capable of withstanding the temperatures of the hot de-icing air.

Channels 33 extend from the air inlet 31 to the air outlet 32.

The channels 33 are configured to bring hot air entering through the air inlet 31 to the air outlet 32 by extending from the air inlet 31 to the air outlet 32 by passing between the screws 4 of systems for fixing the stator blades 22 fixed to the inner casing 11.

The channels 33 are preferably cylindrical but can take other shapes. For example, between manifolds associated with the inlets and outlets, the channels may be at least partially straight while extending substantially longitudinally, considering a parallel to the general axis of rotation in the turbomachine and the overall direction of flow of the air stream in the turbomachine (see FIG. 3a).

As can be seen in FIG. 2, curved channels are on either side of a central channel which is straight between the air inlet 31 and the air outlet 32. The further the channels are from the central channel, the more the radius of curvature is accentuated. This is due to the fact that all the channels must leave from the air inlet 31 to arrive to the air outlet 32. This air outlet 32 opens out in the case of FIG. 2 directly into the cavity 13, for example passing through a corresponding orifice made in a radial shroud 111 of the inner casing 11.

In this figure, the de-icing device 30 comprises five channels, of course a different number can be provided. The number of channels will depend on a compromise particularly between the maximum flow rate for each de-icing device, the circumferential spacing between the fastening system screws, the height radially available in the inter-flow path space, the pressure drop resulting from the connections of the channels and for example the allocated mass of material so that the device is sufficiently resistant.

Such a de-icing device is advantageously obtained by means of an additive manufacturing method, preferably of the laser fusion type of a nickel-based alloy powder or of the steel type. Such a method allows obtaining complex shapes like the shape of FIG. 2.

In relation to FIGS. 3a and 3b, a de-icing assembly disposed in the splitter nose comprises several de-icing devices as described above. Each of these devices includes an outlet 32 as a manifold extending circumferentially in correspondence with its corresponding sector in the circumferential cavity 13. In one embodiment, each manifold outlet 32 includes at least one air outlet orifice towards the cavity 13.

As can be seen in these figures, the de-icing devices 30 are intended to be disposed around the inner casing 11 of the de-icing nose of the turbomachine in the inter-flow path space 10, the air inlets 31 of each of the de-icing devices being connected together by a hot air supply duct 34 configured to bring hot air to each air inlet. The hot air supply duct 34 is itself supplied by at least one general hot air supply tube 3.

The supply duct 34 is circumferential and conforms in its shape to the shape of the inner casing and preferably extends between two rows of stator blade fixing screws.

The invention claimed is:

1. A turbomachine comprising:
   a fan;
   a splitter nose positioned downstream of the fan and extending along a longitudinal axis, the splitter nose comprising an inner casing and an outer casing to form a separation between a primary flow path for a primary stream and a secondary flow path for a secondary stream, the primary flow path and the secondary flow path being derived from the fan, the inner casing and the outer casing defining an inter-flow path space, a first row of stator guide blades positioned in the primary flow path and being the most upstream stator guide blades impacted by the primary stream in the primary flow path, a second row of stator guide blades positioned in the primary flow path downstream from the first row of stator guide blades and fixed by screws to the inner casing, so that the screws extend into the inter-flow path space, and a de-icing assembly for supplying de-icing air for the splitter nose; wherein the de-icing assembly comprises a plurality of de-icing devices, each de-icing device of the plurality of deicing device comprising:

a first primary channel, the first primary channel being an air inlet;

a second primary channel, the second primary channel being an air outlet and the second primary channel facing with the first primary channel; and a plurality of secondary channels, each secondary channel of the plurality of secondary channels is arranged in relationship to each other so that each secondary channel of the plurality of secondary channels extend from the first primary channel to the second primary channel;

wherein each secondary channel of the plurality of secondary channels of each de-icing device of the plurality of de-icing devices is positioned in the inter-flow path space and between the screws fixing the second row of the stator guide blades to the inter-flow path space; and wherein the plurality of first primary channels of the plurality of de-icing device are connected by a hot air supply duct configured to bring the de-icing air to each first primary channel of each de-icing device of the plurality of de-icing devices, wherein, for each de-icing device of the plurality of de-icing devices, the plurality of secondary channels comprises five secondary channels.

2. The turbomachine according to claim 1, wherein each secondary channel of the plurality of secondary channels of each de-icing device of the plurality of de-icing devices has a circular section.

3. The turbomachine according to claim 1, wherein, for each de-icing device of the plurality of de-icing devices, the first primary channel and/or the second primary channel has/have a circular section.

4. The turbomachine according to claim 1, wherein, for each de-icing device of the plurality of de-icing devices, one secondary channel of the plurality of secondary channels extends longitudinally between the first primary channel and the second primary channel.

* * * * *